(12) United States Patent
Cervantes et al.

(10) Patent No.: US 8,904,387 B2
(45) Date of Patent: *Dec. 2, 2014

(54) STORAGE MANAGER FOR VIRTUAL MACHINES WITH VIRTUAL STORAGE

(75) Inventors: Ezequiel Cervantes, Tucson, AZ (US); David Joseph Gimpl, Rochester, MN (US); Elfred Pagan, Austin, TX (US); Sudhir Gurunandan Rao, Portland, OR (US); Murali Krishna Somarouthu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/434,789

(22) Filed: Mar. 29, 2012

(65) Prior Publication Data

US 2012/0198448 A1 Aug. 2, 2012

Related U.S. Application Data

(63) Continuation of application No. 12/829,714, filed on Jul. 2, 2010, now Pat. No. 8,434,081.

(51) Int. Cl.
*G06F 9/455* (2006.01)
*G06F 9/46* (2006.01)
*G06F 15/173* (2006.01)
*G06F 3/00* (2006.01)
*G06F 9/44* (2006.01)
*G06F 13/00* (2006.01)

(52) U.S. Cl.
CPC .. *G06F 9/45558* (2013.01); *G06F 2009/45579* (2013.01); *G06F 2009/45575* (2013.01); *G06F 2009/45562* (2013.01)
USPC ............... 718/1; 718/100; 718/104; 709/226; 719/328

(58) Field of Classification Search
None
See application file for complete search history.

(56) References Cited

U.S. PATENT DOCUMENTS

| 6,880,002 B2 | 4/2005 | Hirschfeld et al. |
| 7,257,584 B2 | 8/2007 | Hirschfeld et al. |
| 7,533,229 B1 | 5/2009 | van Rietschote |
| 7,596,620 B1 | 9/2009 | Colton et al. |

(Continued)

OTHER PUBLICATIONS

Notice of Allowance in U.S. Appl. No. 12/829,714 mailed on Dec. 21, 2012.

(Continued)

*Primary Examiner* — Charles Swift
(74) *Attorney, Agent, or Firm* — Mitch Harris, Atty at Law, LLC; Andrew M. Harris; Matthew W. Baca (57) ABSTRACT

A storage manager connects containers of virtual machine (VM) images and virtual storage device data within hosts. The storage management provides a set of northbound application programming interfaces (APIs) that allow configuration of images associated with VM images and virtual storage devices provided to the operating systems and applications within virtual machine images. The northbound APIs, include methods for creating a virtual storage container that contains storage for the VM instance and also at least one virtual storage device to be provided to an operating system executed by the VM, a method for causing an attach of the virtual storage container to the host and a method for causing a deployment of the virtual storage device within the host. A set of southbound APIs are provided by the host, including at least a method that creates virtual storage devices and a method that attaches virtual storage devices to the host.

15 Claims, 7 Drawing Sheets

(56) References Cited

U.S. PATENT DOCUMENTS

| | | |
|---|---|---|
| 8,151,033 B2 | 4/2012 | Dake |
| 2007/0079307 A1* | 4/2007 | Dhawan et al. ............ 718/1 |
| 2007/0244938 A1 | 10/2007 | Michael et al. |
| 2007/0271276 A1 | 11/2007 | Allen et al. |
| 2008/0034365 A1 | 2/2008 | Dahlstedt |
| 2008/0155169 A1 | 6/2008 | Hiltgen et al. |
| 2008/0295094 A1 | 11/2008 | Korupolu et al. |
| 2009/0113422 A1* | 4/2009 | Kani ............................ 718/1 |
| 2009/0177634 A1 | 7/2009 | Behrendt et al. |
| 2009/0187970 A1 | 7/2009 | Mower et al. |
| 2009/0210875 A1* | 8/2009 | Bolles et al. ................ 718/1 |
| 2009/0216999 A1 | 8/2009 | Gebhart et al. |
| 2009/0271472 A1 | 10/2009 | Scheifler et al. |
| 2009/0313447 A1 | 12/2009 | Nguyen et al. |
| 2010/0306445 A1* | 12/2010 | Dake ........................... 711/6 |
| 2011/0004676 A1 | 1/2011 | Kawato |
| 2011/0010515 A1 | 1/2011 | Ranade |
| 2011/0119748 A1 | 5/2011 | Edwards et al. |
| 2011/0145814 A1 | 6/2011 | Mangione-Smith |
| 2011/0154320 A1 | 6/2011 | Verma |
| 2011/0173605 A1 | 7/2011 | Bourne |

OTHER PUBLICATIONS

Mesnier, et al. "Object-Based Storage," IEEE Communications Magazine, Aug. 2003, pp. 84-90, vol. 41, Issue 8, IEEE Press, Piscataway, NJ, USA.

http://searchservervirtualization.techtarget.com/definition/hypervisor, WhatIs.com definition of Hypervisor, retrieved Sep. 21, 2012.

Office Action in U.S. Appl. No. 12/829,714 mailed on Jul. 18, 2012.

Office Action in U.S. Appl. No. 12/829,714 mailed on Jul. 18, 2012, 13 pages. (pp. 1-13 in pdf).

Notice of Allowance in U.S. Appl. No. 12/829,714 mailed on Dec. 21, 2012, 12 pages. (pp. 1-12 in pdf).

http://searchservervirtualization.techtarget.com/definition/hypervisor, WhatIs.com definition of Hypervisor, retrieved Sep. 21, 2012, 2 pages (pp. 1-2 in pdf).

* cited by examiner

STORAGE MANAGER FOR VIRTUAL MACHINES WITH VIRTUAL STORAGE

The present U.S. patent application is a Continuation of U.S. patent application Ser. No. 12/829,714 filed on Jul. 2, 2010 and claims priority thereto under 35 U.S.C. 120.

BACKGROUND OF THE INVENTION

1. Field of the Invention

The present invention is related to storage systems management software, and more particularly to a storage manager for providing virtual disks to virtual machine images.

2. Description of Related Art

Virtualized computing systems, also known as cloud computing systems, provide large-scale computing functionality in applications such as management of large databases and scientific computing, and large-quantity server functionality in applications such as web page servers and other Internet traffic handling. A virtualized computer system typically provides a platform for executing instances of different operating systems, and hosting multiple applications within each operating systems instance. The computer hardware employed is also virtualized in the sense that multiple distributed processors and local memories form a large-scale multiprocessing system with a distributed system memory.

Storage within present-day virtualized computing systems is typically manually configured for each particular virtual machine, by a system operator using management tools that configure the storage that will be provided to the particular virtual machine. The storage is typically tied to a particular physical disk, although the same locations within the physical disk may be shared when the particular virtual machine is off-line by storing a virtual machine image including the virtual machine's disk-based storage at another off-line location. Beyond the virtual storage devices within the virtual machine image, storage within a virtualized computing system also stores and retrieves the image itself, when the virtual machines are taken off-line and then brought on-line. In a typical storage assignment for a virtual machine image, two disk images are used: one for the virtual machine image, i.e., the disk used by the operating system, and another disk for providing the storage used by applications running within the virtual machine. Finally, not only are virtual machine images managed to and from storage, and virtual storage devices allocated at virtual image startup, but at run-time, resources are dynamically managed in order to provide resources needed by various applications, as well as the operating system/virtual machine image.

However, management of virtual machine images, virtual disks provided to virtual machines, and run-time management of storage resources are performed separately according to different configurations specified by the system administrator(s). Further, some applications, such as database servers, are written to access raw storage devices, and therefore use storage resource that are typically understood to correspond to the virtual machine image and not virtual disks provided by the virtual machine to applications.

Therefore, it would be desirable to provide a method and program within a computer system that provide virtual disk storage to virtual computer system instances, without requiring excessive system administrator intervention and that unify startup, shutdown and run-time storage management in a virtualized computer system.

BRIEF SUMMARY OF THE INVENTION

The invention is embodied in a computer-performed method that provides virtual disk storage to virtual computer system images.

The method implements a storage management program/object that serves as an intermediary between storage subsystems and a host, such as a virtual machine manager, e.g., a hypervisor. The storage management program/object can be configured through a single user interface and provides unified handling of virtual machine image storage/retrieval, as well as management of virtual disk volumes provided to the operating systems and applications within virtual machine images. The virtual machine images include the state of the corresponding virtual machines and the virtual storage supplied to the virtual machines, so that the entire state of a virtual machine and its storage can be captured in a snapshot and copied, stored when taking a virtual machine off line and loaded when restoring the virtual machine on the system. The storage management program/object thus provides uniform connectivity between the various storage consumers within a virtualized computer system, as well as centralized storage configuration management.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to storage within virtualized computing systems, and in particular a storage management technique implemented by a storage manager program/object that unifies the storage of virtual machine images with the contents of virtual storage devices used by the corresponding virtual machine operating system and applications. The resulting operation allows for facile and automatic control of deployment (instantiation), un-deployment (take-down), snapshot-taking, and storage of complete virtual machine environments in a single container per virtual machine.

Figure 1:
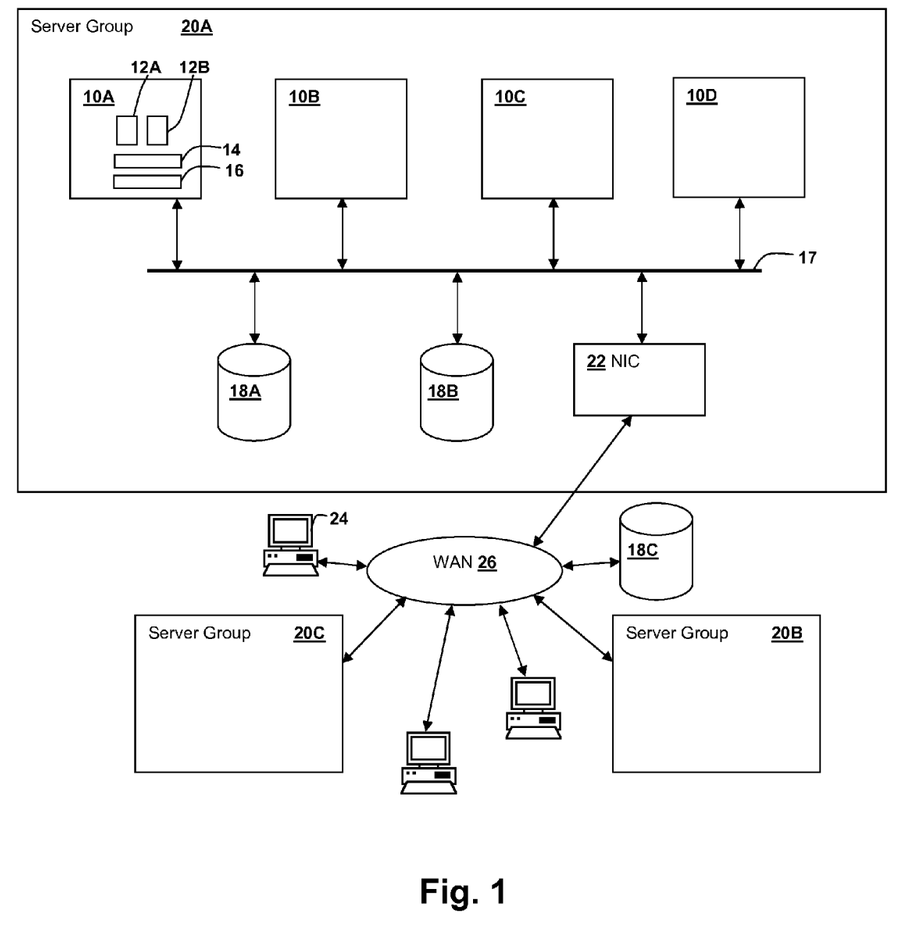
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A number of server groups 20A-20C are illustrated as connected via a wide area network (WAN) 26, which may be an Internet-connected network or other network. A plurality of workstation terminals 24 are also shown as coupled to WAN 26 and provided user communication with the networked computer system. In particular, a user interface for configuring a storage manager in accordance with an embodiment of the present invention is accessible via workstation terminals 24. Exemplary server group 20A includes a plurality of processing nodes 10A-10D, that each include processor cores 12A-12B, external cache levels 14 and system memory 16, which may be accessed by other processing nodes 10A coupled to local bus 17, and also by other server nodes coupled through WAN 26 via network interface controller (NIC) 22. Program instructions forming storage manager objects, services or programs in accordance with embodiments of the present invention as described below are generally present in system memory 16 and executed by one or more of processor codes 12A-12B to provide control of virtual storage within the networked computer system. Physical storage within the networked computer system is provided by local storage 18A, 18B associated with server groups 20A-20C, and also networked storage subsystems 18C that are not associated with a particular server group.

The networked computer system of FIG. 1 is only an example of a physical computer system in which virtualized operation of multiple operating system images is practical and is supported by the hardware configuration. However it is understood that techniques in accordance with embodiments of the present invention as described in further detail below can be implemented in a variety of computer systems, both larger and smaller scaled.

Figure 2:
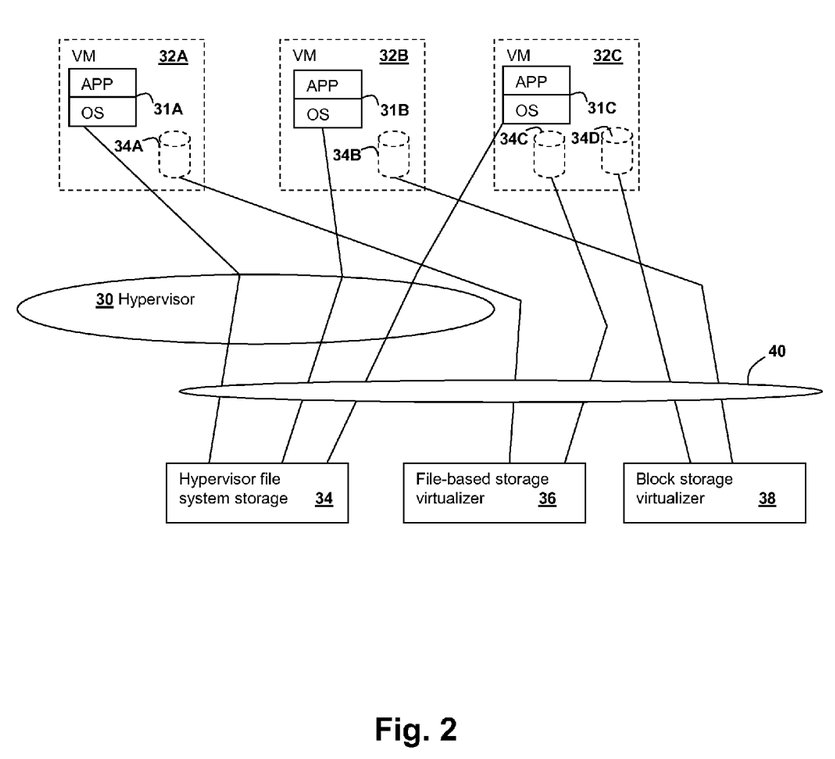
FIG. 2 is a block diagram illustrating a virtualized organization of software that can be executed within the system of FIG. 1, in accordance with an embodiment of the present invention.

Referring now to FIG. 2, organization of a virtualized computer system that may be executed within the computer system of FIG. 1, is shown in accordance with an embodiment of the present invention. A number of virtual machines (VMs) 32A-32C are illustrated, each having an operating system (OS) and application (APP) image 31A. In the illustrative example, one OS image is used per application, i.e., an OS instance is generated for each application for which execution is requested by the system, as is the case with many Web-based computing models presently in use. However, it is understood that there may be multiple applications executed within one virtual machine, without substantially changing the manner in which the techniques of the present invention are performed. Each VM 32A-32C is also illustrated as having a virtual storage (disk) device 34A-34C, one for each of VMs 32A-32C. Virtual storage devices 34A-34C represent the disk device assigned for use by the virtual machine, which in the illustrative example is a single disk accessed by the applications, and by the operating systems for external storage. The data stored in virtual storage devices 34A-34C may be filed-based or block-based, and is allocated by a file-based storage virtualizer 36 or a block storage virtualizer 38, according to the type of storage. Other virtual disk device storage associated with VMs 32A-32C is the storage used for paging the operating machine images themselves, which is typically managed by the hypervisor, from hypervisor file system storage 34. However, in previous systems, the block storage virtualizer 36 and the file-based storage virtualizer 38 are typically managed separately from the hypervisor 30 management of storage resources. In order to provide virtual disk storage to an application within a virtual machine, the virtual machine environment is pre-configured to allocate resources from the block storage virtualizer 36 and the file-based storage virtualizer 38.

In the present invention, a storage manager object 40 manages all virtual disk storage resources used by the VMs 32A-32C, as well as the disk storage managed by hypervisor 30 for storing the images of operating systems and applications within VMs 32A-32C. Storage manager object 40 is aware of, and manages, connections from hypervisor file system storage 34, which provides the storage for operating system/application images, as well as allocation of underlying virtual block storage devices 34B, 34D and virtual file-based storage devices 34A, 34C. While storage manager 40 in the example of FIG. 2, uses an existing file-based storage virtualizer 36 and an existing block storage virtualizer 38 to provide the virtual storage resources, if a file-based storage virtualizer 36 were not available, storage manger object could employ a file system to implement file-based storage via block storage virtualizer and similarly, if block storage virtualizer 38 were not available, virtual block storage could be implemented in a file provided via file-based storage virtualizer 36. Both types of storage must generally be supported, since application such as databases may include direct accesses to underlying block storage for speed, while file-based storage is the norm for datafiles.

Figure 3:
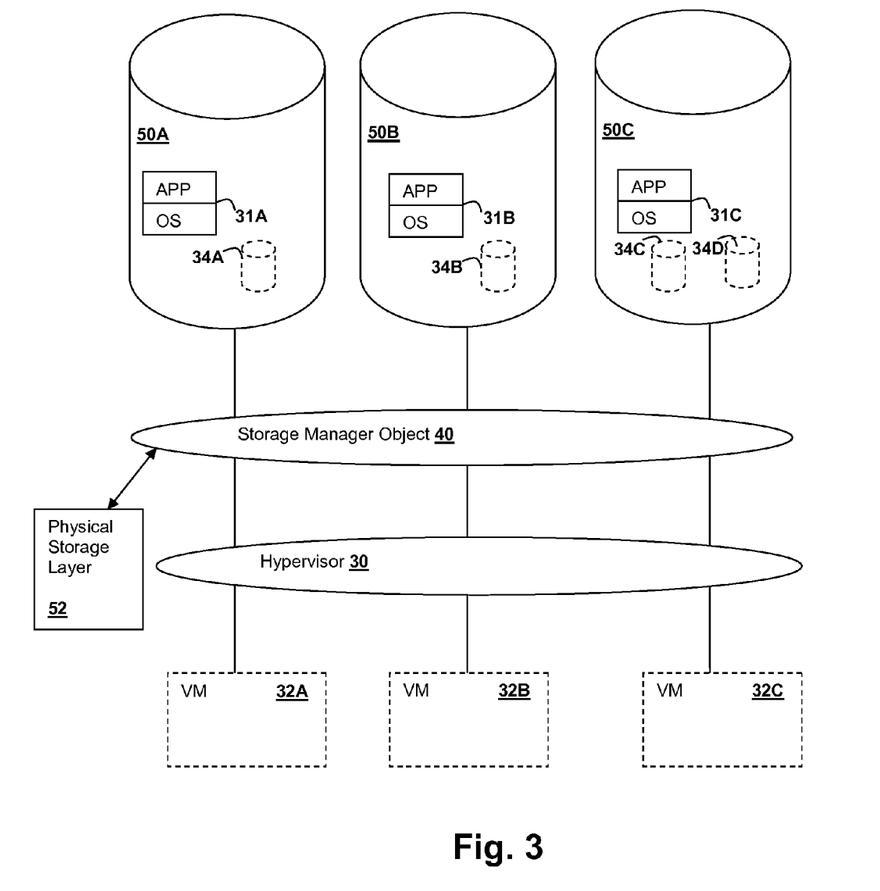
FIG. 3 is a block diagram a virtual storage management organization in accordance with an embodiment of the present invention.

Since storage manager 40 manages all disk storage resources associated with VM 32A-32C, images representing the complete state of each of VMs 32A-32C and their associated virtual storage devices 34A-34D can be contained as illustrated in FIG. 3, and are referred to herein as virtual multi-disks (VMDs). VMDs 50A-50C are containers that hold the contents of corresponding VMs 32A-32B, and are managed by storage manger 40 to load (deploy) and unload (un-deploy) the images of both the operating systems and applications 31A-31C, as well as the virtual disk storage devices 34A-34D as a single unit. The connections for virtual storage devices 34A-34D shown mapped through hypervisor 30, can be implemented, in accordance with a particular embodiment of the present invention, by generating virtual SCSI devices that are presented to hypervisor for use by corresponding VMs 32A-32C. Therefore, storage manager 40, which is effectively a middleware object that may be implemented as a platform service, has control of VMDs 50A-50C, and can then manage where VMDs 50A-50C are stored within physical storage, as accessed by a physical storage system layer 52, and can provide complete images of virtual machines and their associated data and other OS or application storage such as OS page files, to hypervisor 30 on demand. Or, as illustrated in FIG. 2, the storage managed by storage manager 40 may be further managed through subsystems such as block storage virtualizer 38 and file-based storage virtualizer 36.

Figure 4:
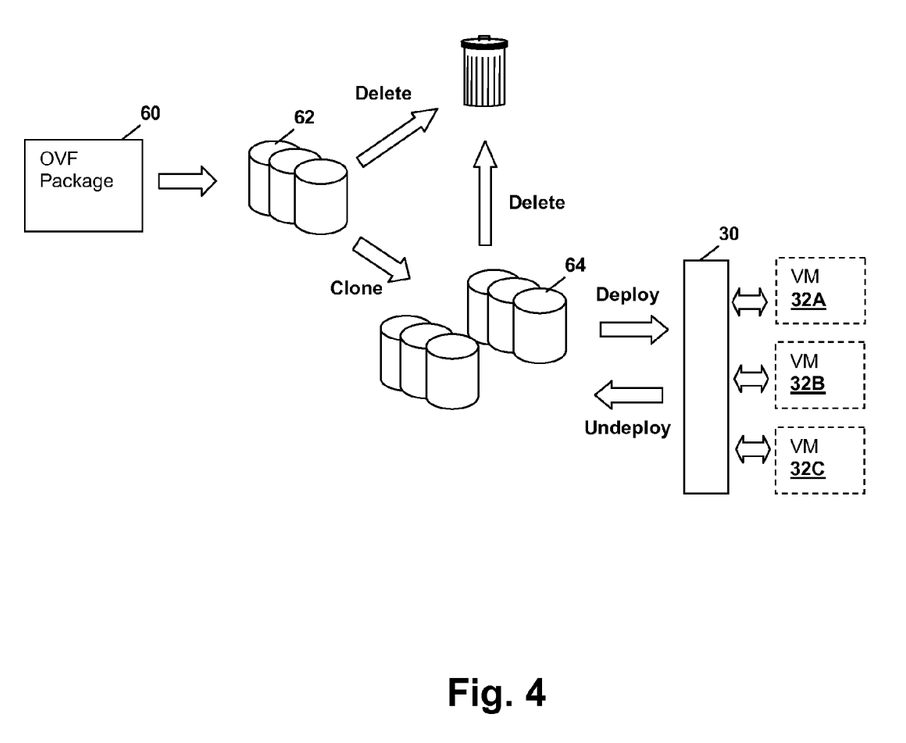
FIG. 4 is a flow diagram depicting a life cycle of virtual machine storage in accordance with an embodiment of the present invention.

Referring now to FIG. 4, a life cycle of a VMD as managed by storage manager 40 is illustrated in a flow diagram. A base image, exemplified by an open virtualization format (OVF) package 60, is loaded from off-line storage to generate a master image 62, illustrated in the figure as an image of multiple volumes for generality, but that may be a single master image volume. Master VMD image 62 is cloned into one or more copied VMD clones 64 before being deployed by hypervisor 30 to become a corresponding one of VMs 32A-32C. Since the cloning process can be used to produce multiple copies, it is possible to instantiate multiple identical VMs from a single master image 62. Master image 62 represents the platform-specific master copy of the configuration for the subject virtual machine, and includes the virtual storage configuration and contents for use within the virtual machine as well as the virtual machine image itself. Clones 64 start out as identical to master image 62, but as VMs 32A-32C, execute, if a snapshot is taken a corresponding one of clones 64 associated with the snapshot will be updated and will represent the current state of the corresponding one of VMs 32A-32C. The updated version of clones 64, can then be stored as a new master image or as a separate instance of the corresponding one of VMs 32A-32C to be re-deployed at next startup.

Figure 5:
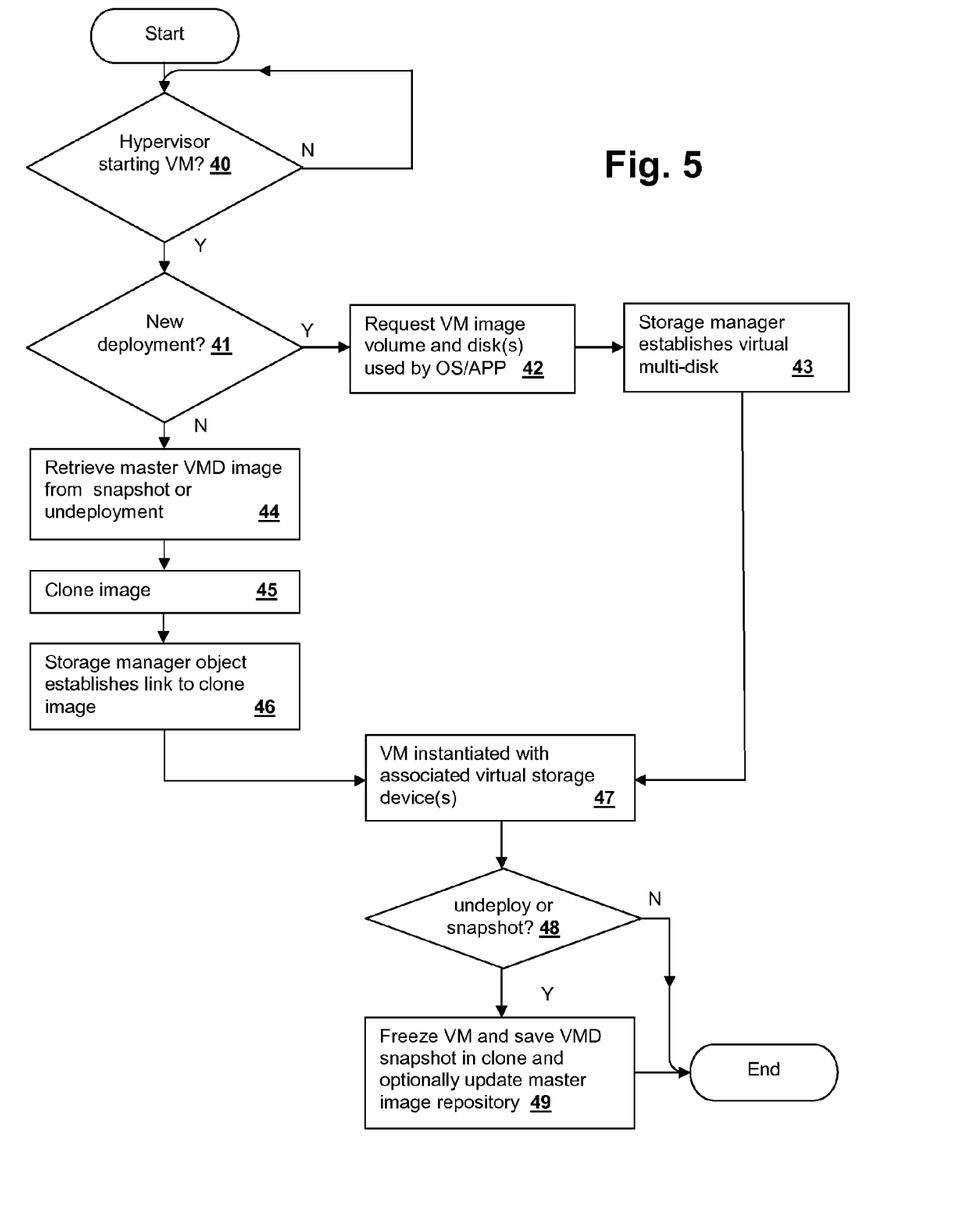
FIG. 5 is a flow chart of a storage management method in accordance with an embodiment of the present invention.

Referring now to FIG. 5, a method of operation of storage manager 40 is shown in a flow chart, in accordance with an embodiment of the present invention. When a hypervisor prepares to start a VM (decision 40), if the VM is a new deployment (decision 41), the virtual machine image volume and virtual disks to be used by the operating system/application are requested from the storage manager (step 42) and the storage manger establishes a VMD to contain the storage resources (step 43). If the VM is not a new deployment (decision 41), then the master VMD image is retrieved from the previous snapshot or undeployment (step 44). The VMD image is then cloned (step 45) and the storage manager establishes the links to the cloned VMD image through the hypervisor, and optionally other virtualizers that interact with the VMs, if needed (step 46). The VM is then instantiated with its associated virtual storage devices (step 47). During execution, if a VM is to be un-deployed or a snapshot taken (decision 48), VM execution is frozen and the snapshot of the VMD is updated in the associated clone, and optionally in the master image repository if restart is not to be immediately performed from the clone (decision 49).

Figure 6:
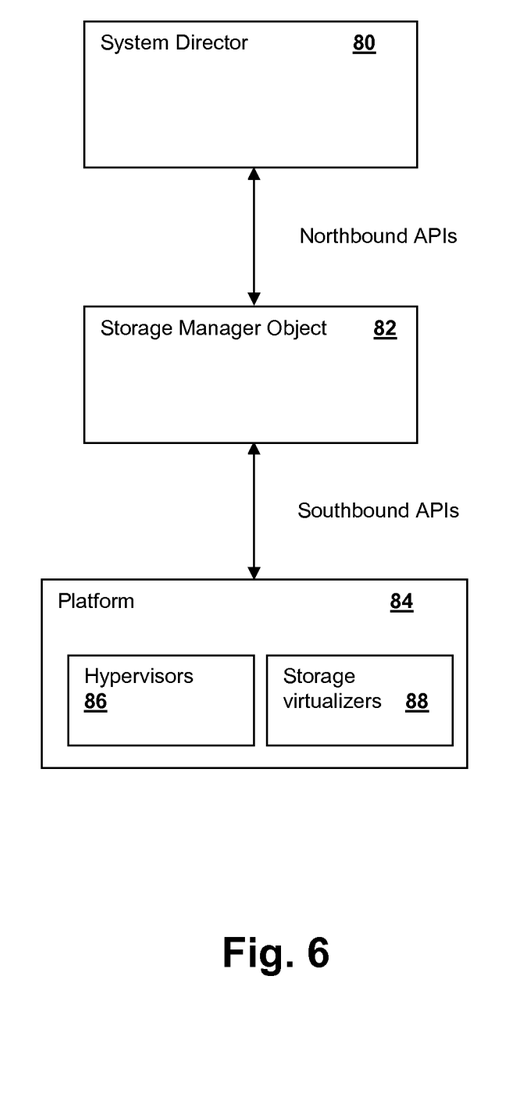
FIG. 6 is a block diagram of a storage manager configuration in accordance with an embodiment of the present invention.

Referring now to FIG. 6, a block diagram of a storage management arrangement within a computer system, according to an embodiment of the present invention, is shown. A system director 80 that provides administrative user interfaces, configuration storage and retrieval and other tools for managing the computer system is coupled to storage manager object 82 by a set of northbound application programming interfaces (APIs) that provide for retrieving views of containers managed by storage manager object 82 and controlling the above-described management of VMDs for VMs. Storage manager object 82 is also coupled to the particular platform 84 that supports VM execution, via the hypervisors 86 and in some cases storage virtualizers 88 that are particular to the platform. Therefore, to support storage manager object 82 on a particular platform 84 an interface implementing at least a minimum set of required southbound APIs is provided by a service or object within platform 84, which can be hypervisors 88.

The following is an exemplary set of Northbound APIs supported by a storage management object in accordance with an embodiment of the present invention:

getStorageSubsystemsByHosts—This method retrieves a list of StorageSubsystems connected to the hosts specified in input.

getStorageContainersByHosts—This method retrieves a list of block storage pools or file shares connected to the hosts specified in input.

get VirtualMultiDisks_—Returns all of the VMDs for the container specified as input.

createVirtualMultiDisk—Creates empty containers (volumes in storage area network or files in network-attached-storage) represented by a VMD to which data can be written.

copyVirtualMultiDisk—Copies the specified source VMD to a target VMD. The underlying block or file storage is seamlessly copied from one VMD to the other.

attach VirtualMultiDisk—attaches a virtual disk within a VMD to a host (e.g., a hypervisor).

deploy VirtualMultiDisk—associates a virtual disk within a VMD to a guest operating system (e.g., a VM).

unDeployVirtualMultiDisk—disassociates the virtual disk associated with a guest operating system (e.g., a VM).

detach VirtualMultiDisk—detaches a virtual disk in a VMD from a host (e.g., a hypervisor).

delete VirtualMultiDisk—deletes the virtual disks (or storage volume or file) stored within aVMD.

registerRepository—registers a storage area network (SAN) pool or network-attached-storage (NAS) fileshare as a repository for VMD containers.

deregisterRepository—deregisters the SAN pool or NAS fileshare as an image repository.

get VirtualMultiDiskOrder—returns an array of virtual disks within a VMD in the order that the virtual disks should be associated with a VM.

set VirtualMultiDiskOrder—re-sequences the existing order of the virtual disks within a VMD.

The set of APIs above is not exhaustive, and is only exemplary of a basic set of APIs that can be used by system director 80 to control the configuration and deployment of VMDs by storage manager 82.

The following is an exemplary set of Southbound APIs that may be required by a storage management object in accordance with an embodiment of the present invention. The host platform, generally the hypervisor and storage subsystems support these APIs.

createVirtualDisks—performs operations within the host, e.g., a hypervisor, to generate the virtual disks for later attachment to a VM.

deployVirtualDisks—performs operations within the host, e.g., a hypervisor, to attach the virtual disks to the virtual server.

replaceVirtualDisk—replaces a virtual disk attached to a VM with another undeployVirtualDisk—detaches a virtual disk from a VM.

deleteVirtualDisk—deletes a virtual disk from a VM definition.

set VirtualMultiDiskOrder—re-orders the disks associated with a VM copyVirtualDisk—copies a virtual disk createFile, createVirtualVolume, createVirtualVolumeGroup, delete VirtualVolume, deleteVirtualVolumeGroup—allows storage manager to develop, organize and dispose of storage.

copyFiletoFile, copyBitsFileToDisk, copyBitsFileToFile—allows storage manager to efficiently copy block and file storage.

transformRawDiskToPlatformCustom—allows import of generic raw disk to VMD transformPlatformCustomToRawDisk—allows export of VMD as generic raw disk.

The set of APIs above is not exhaustive, and is only exemplary of a basic set of APIs that can be used by system director 80 as provided by platform 84.

Figure 7A:
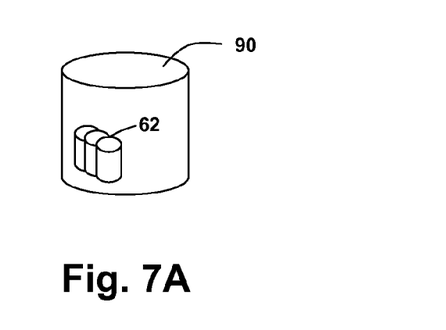
FIGS. 7A-7C depict options for the storage of virtual machine images in a system in accordance with an embodiment of the present invention.
Figure 7B:
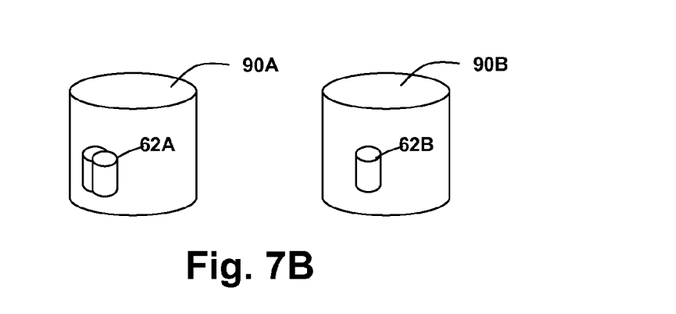
Figure 7C:
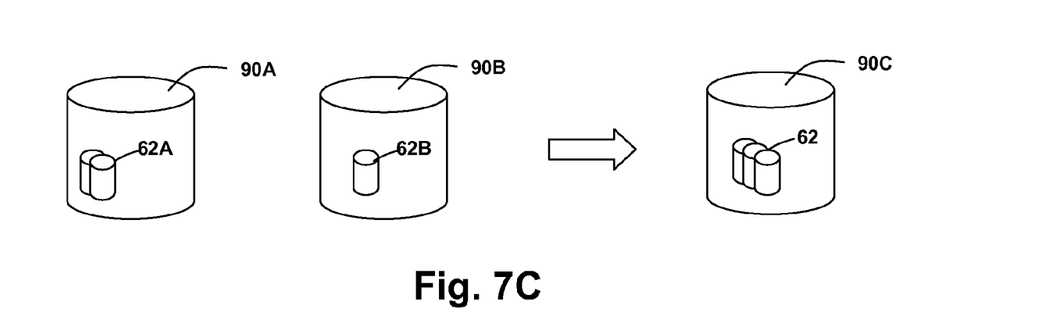

Referring now to FIG. 7A, one possible arrangement of physical storage of a VMD image 62 is shown. A single physical storage device 90 contains, in a file or block-based image, all of the contents of VMD image 62. The storage configuration of FIG. 7A is illustrative of both master and clone VMD image storage, and the active storage with the VM itself as linked by file or block-based pointers to the contents of physical storage device 90 for all of the portions of the active VM image that are not presently within system memory. Further, the copying of the master image and cloning may be performed as full copies, or may represent cached differences according to pointers to the underlying file or block-based image within physical storage device. Referring now to FIG. 7B, another arrangement of physical storage of VMD image 62 is shown. VMD image 62 is physically separated into a first VMD portion 62A stored in a first physical storage device 92A. For example, VMD image portion 62A may contain contents such as the virtual storage devices used by the VM. Second VMD portion 62B is stored on a second physical storage device 90B, and in the example may store the VM OS image itself and the backing store for OS paging. Referring now to FIG. 7C, another storage configuration is shown. The storage configuration shown in FIG. 7C uses the scheme of FIG. 7B in the master repository of VMD images, but when the VMD master image is cloned, the copy is made to a single VMD image 62 within a single physical storage device 90C, e.g., a physical storage device local to processing node(s) that will be executing the corresponding VM. The converse operation is also possible, with a single "bundled" master image being cloned into a VMD having different portions stored on different physical storage devices as illustrated by FIG. 7B, which is a configuration useful for ensuring that master images are grouped together, but that application data and OS file storage are maintained on separate physical devices during VM execution.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for managing storage associated with a virtual processing machine instance within a computer system from a storage manager, comprising:
   providing a northbound set of application programming interfaces including a first method for creating a virtual storage container that contains first storage for an image of a virtual machine instance and further contains second storage for at least one virtual storage device to be provided to an operating system executing within the virtual machine instance, a second method for causing the storage manager to attach the virtual storage container to a host that is designated for hosting the virtual machine instance, and a third method for causing the storage manager to deploy the second storage as the at least one virtual storage device within the virtual machine instance, wherein the northbound set of application programming interfaces further includes a method for un-deploying the at least one virtual storage device and a method for detaching the virtual storage container from the host; and
   exploiting a southbound set of application programming interfaces provided by the host, wherein the southbound set of application programming interfaces includes at least a fourth method to create the at least one virtual storage device and a fifth method to attach the virtual storage device to the host, and wherein the storage manager calls the fourth and fifth methods to implement requests received by the second method and the third method.

2. The computer-performed method of claim 1, wherein the northbound set of application programming interfaces further includes a method listing virtual storage containers associated with a host.

3. The computer-performed method of claim 1, wherein the northbound set of application programming interfaces further includes a method listing virtual storage containers associated with a host.

4. The computer-performed method of claim 1, wherein the northbound set of application programming interfaces further includes a method for re-ordering virtual storage devices represented in a particular virtual storage container.

5. The computer-performed method of claim 1, where in the northbound set of application programming interfaces further includes a method for registering physical storage as a repository for virtual storage containers.

6. The computer-performed method of claim 1, wherein the southbound set of application programming interfaces further includes methods for importing and exporting the virtual storage container to and from raw disk storage.

7. A computer system comprising a processor for executing program instructions and a memory coupled to the processor for executing the program instructions, wherein the program instructions implement a storage manager for managing storage associated with a virtual machine instance within the computer system, wherein the program instructions comprise program instructions for:
   providing a northbound set of application programming interfaces including a first method for creating a virtual storage container that contains first storage for an image of the virtual machine instance and further contains second storage for at least one virtual storage device to be provided to an operating system executing within the virtual machine instance, a second method for causing the storage manager to attach the virtual storage container to a host that is designated for hosting the virtual machine instance, and a third method for causing the storage manager to deploy the second storage as the at least one virtual storage device within the virtual machine instance, wherein the northbound set of application programming interfaces further includes a method for un-deploying the at least one virtual storage device and a method for detaching the virtual storage container from the host; and
   exploiting a southbound set of application programming interfaces provided by the host, wherein the southbound set of application programming interfaces includes at least a fourth method to create the at least one virtual storage device and a fifth method to attach the virtual storage device to the host, wherein the storage manager calls the fourth method to implement requests received by the second method, and wherein the storage manager calls the fifth method to implement requests received by the third method.

8. The computer system of claim 7, wherein the northbound set of application programming interfaces further includes a method listing virtual storage containers associated with a host.

9. The computer system of claim 7, wherein the northbound set of application programming interfaces further includes a method listing virtual storage containers associated with a host.

10. The computer system of claim 7, wherein the northbound set of application programming interfaces further includes a method for re-ordering virtual storage devices represented in a particular virtual storage container.

11. The computer system of claim 7, where in the northbound set of application programming interfaces further includes a method for registering physical storage as a repository for virtual storage containers.

12. A computer program product comprising a non-transitory computer-readable storage media storing program instructions for execution within a computer system, wherein the program instructions implement a storage manager for managing storage associated with a virtual machine instance within the computer system, wherein the program instructions comprise program instructions for:

providing a northbound set of application programming interfaces including a first method for creating a virtual storage container that contains first storage for an image of the virtual machine instance and further contains second storage for at least one virtual storage device to be provided to an operating system executing within the virtual machine instance, a second method for causing the storage manager to attach the virtual storage container to a host that is designated for hosting the virtual machine instance, and a third method for causing the storage manager to deploy the second storage as the at least one virtual storage device within the virtual machine instance, wherein the northbound set of application programming interfaces further includes a method for un-deploying the at least one virtual storage device and a method for detaching the virtual storage container from the host; and exploiting a southbound set of application programming interfaces provided by the host, wherein the southbound set of application programming interfaces includes at least a fourth method to create the at least one virtual storage device and a fifth method to attach the virtual storage device to the host, wherein the storage manager calls the fourth method to implement requests received by the second method, and wherein the storage manager calls the fifth method to implement requests received by the third method.

13. The computer program product of claim 12, wherein the northbound set of application programming interfaces further includes a method listing virtual storage containers associated with a host.

14. The computer program product of claim 12, wherein the northbound set of application programming interfaces further includes a method for re-ordering virtual storage devices represented in a particular virtual storage container.

15. The computer program product of claim 12, where in the northbound set of application programming interfaces further includes a method for registering physical storage as a repository for virtual storage containers.

* * * * *